C. L. GOODRICH.
TOOL SUPPORTING ATTACHMENT FOR TURRET LATHES.
APPLICATION FILED OCT. 27, 1909.
968,045.  Patented Aug. 23, 1910.
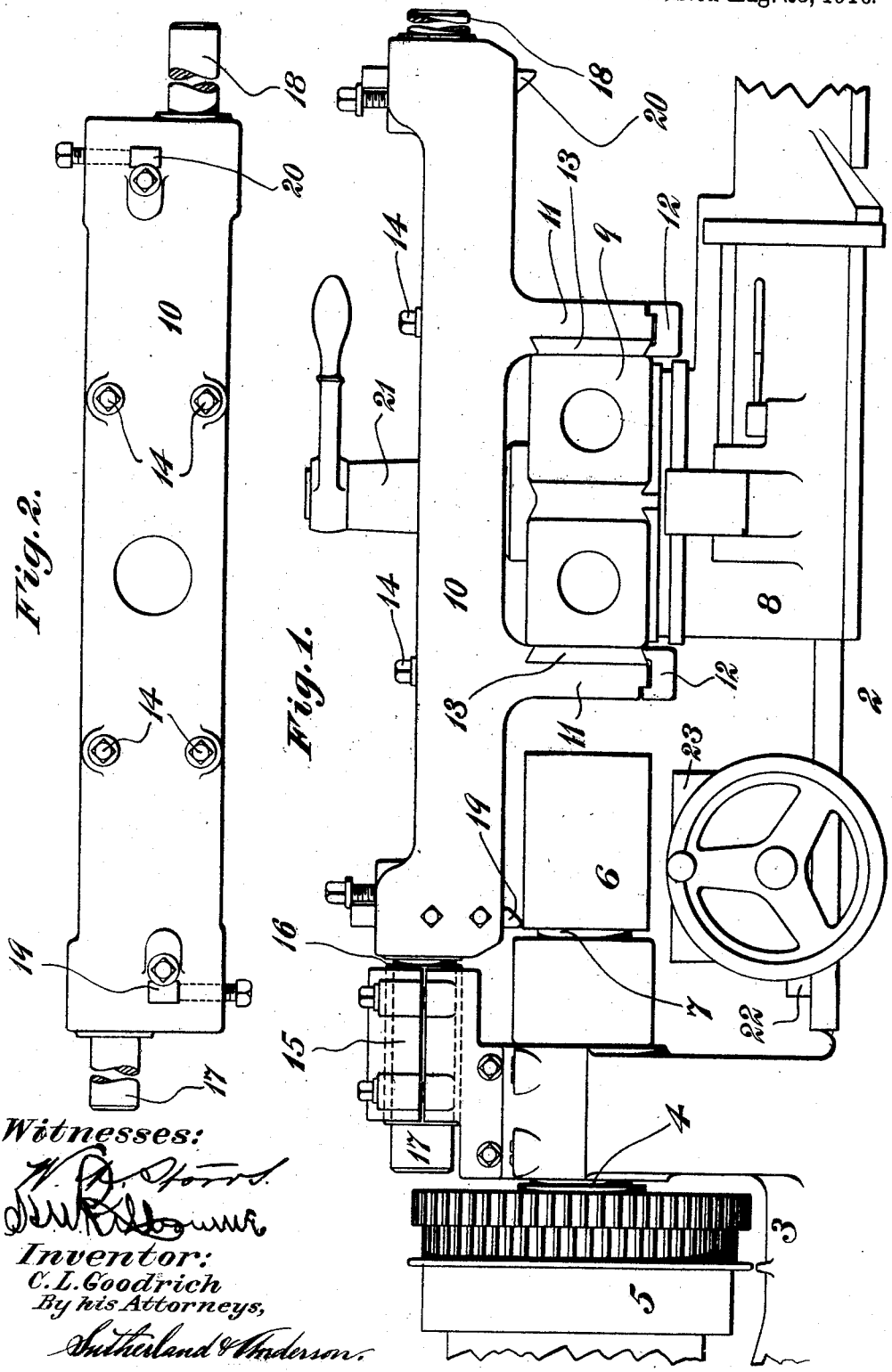

UNITED STATES PATENT OFFICE.

CLARENCE L. GOODRICH, OF HARTFORD, CONNECTICUT, ASSIGNOR TO PRATT & WHITNEY COMPANY, OF HARTFORD, CONNECTICUT, A CORPORATION OF NEW JERSEY.

TOOL-SUPPORTING ATTACHMENT FOR TURRET-LATHES.

968,045.  Specification of Letters Patent.  Patented Aug. 23, 1910.

Application filed October 27, 1909. Serial No. 524,968.

*To all whom it may concern:*

Be it known that I, CLARENCE L. GOODRICH, a citizen of the United States, residing at Hartford, in the county of Hartford and State of Connecticut, have invented certain new and useful Improvements in Tool-Supporting Attachments for Turret-Lathes, of which the following is a specification.

This invention relates to tool supporting attachments for turret lathes.

The primary object of the invention is to provide simple means for effectually bracing the tool or tools so that chattering or similar motion thereof is not possible in view of which accurate and precise results are possible.

In the drawings accompanying and forming part of the present specification I show in detail one convenient form of embodiment of the invention which to enable those skilled in the art to practice the same will be set forth fully in the following description while the novelty of the invention will be included in the claims succeeding said description. I desire to indicate at this point that I do not limit myself to the showing thus made for certain variations may be adopted within the scope of my invention as expressed in said claims.

Referring to said drawings, Figure 1 is a side elevation of a turret-lathe in which is embodied means including my invention, and, Fig. 2 is a top plan view of a bridging device hereinafter more fully described.

Like characters refer to like parts in both figures.

In Fig. 1 of the drawings I have shown somewhat a turret lathe of familiar form which I will briefly describe, so that the nature of my invention can be better understood. Said turret-lathe involves in its organization a bed as 2 upon which is mounted a head-stock as 3. This head-stock is normally or during work stationary although as is customary it may be either adjustable on or rigid with said bed and said head-stock presents a convenient work-carrier. Said head-stock is shown supporting a rotary spindle 4 which may be driven through the agency of the well-known mechanism one element of which is the stepped pulley 5 suitably fastened to said spindle. The work which may be of any suitable kind, is denoted by 6 and is sustained by the customary arbor 7 connected with the spindle in any of the usual ways. Movable longitudinally of the bed 2 upon the upper side thereof is a carriage or turret-slide 8 and on said turret-slide is mounted for turning the turret 9. I have shown none of the usual devices for moving said turret-slide and hence the turret thereon, back and forth or for turning the turret on said slide as these form no part of the invention.

The tool or tools which operate upon the work and which are associated operatively with the turret 9 are preferably mounted over the work and are carried by a bridging device which is preferably rigidly connected with one of said parts and which has a sliding connection with the other in the direction of movement of said slide 8 by reason of which said bridge has two supports or bearings at opposite sides of the tool or tools in order to effectually brace said tool or tools in a stable and substantial manner during turning and in the present instance this bridge has a rigid connection with the turret and a sliding connection with the head-stock 3 the bridge being so related with these parts that during turning it is incapable of any other than a longitudinal movement.

The turret 9 is shown as supporting a bridging device as 10 which is represented as an elongated bar from which depend substantially midway between the ends thereof, the parallel legs 11 which present a fork for straddling said turret the fit being a somewhat close one. The said legs are provided at their lower ends with gibs 12 which with said legs are grooved to receive dovetails as 13 on two directly-opposite faces of the turret 9, the gibs being held in place by screws 14 or otherwise. From this it will be evident that said bridging device is removably mounted although when in operative position it will be held in place to the turret in a thoroughly stable manner.

On the head-stock 3 I have shown as mounted a split or divided boxing which constitutes in effect a part of said head-stock and in this boxing is shown as disposed a bushing 16 which during work is tightly held in place by the screws or equivalent clamping means of said boxing although the bushing may be easily removed by loosening said screws or other clamping devices. This bushing 16 presents a convenient socket or seat for alternately receiving the pilots or guide portions 17 and 18 at opposite ends of the bridging bar 10, the pilot 17 being shown as disposed within said bushing. By backing off the turret-slide 8 a sufficient distance the pilot 17 can be slid from out said bushing 16 and the pilot 18 introduced thereinto, it being necessary of course to turn the turret to secure this function and by which the tools 19 and 20 depending from the bar 10 near its terminals can be put alternately into action. The blank 6 is assumed to be a piston blank and the two tools 19 and 20 can be used for circumferentially dressing the said blank one of said tools being used for roughing and the other for finishing. The bridge 10 is therefore in the nature of a duplex device and its pilots fit somewhat freely the bushing the fit being such a one as will not interfere with the free advancing movement of the turret slide but enough to eliminate vibration in said bar 10 during turning. During the turning through the operation of either of the tools 19 or 20 the turret slide 8 will be moved back and forth usually automatically or the operation might be a manual one, and one or the other of the two pilots 17 or 18 will slide back and forth in the bushing 16. The tools 19 and 20 may if desired be adjustable vertically so as to adapt the machine and its attachment to work which varies in diameter.

While I prefer to employ a duplex bridging device this is not essential as there may be instances where I should require but a single tool to operate upon the work. The invention resides as will be obvious in a bridge or equivalent rigid or substantially rigid device extending between the turret or turret-slide and the head-stock or equivalent member having a solid or rigid connection with one of said parts and a slidable connection with the other by reason of which the turret-slide can move freely back and forth while lateral motion of the tool, due to the rigid bracing of its carrying device, is prevented. The bridge therefore has neither lateral nor up and down movements.

The turret 9 may be held in a rotatively adjusted position by suitable clamping means as 21 the shank or stem of which extends through an approximately central opening or perforation in the bar 10 as shown.

The cross slide is denoted by 22 and it may be furnished with the usual accessories which it is not necessary to describe except simply to refer to the tool-block 23 which supports the tools for roughing and finishing the packing grooves which are formed in the piston blank.

What I claim is:

1. An article of manufacture consisting of a tool-carrying device provided with pilot portions at its opposite ends and with means between said ends for securing said device in operative position.

2. An article of manufacture consisting of a tool carrying device provided with pilot portions at its opposite ends and with a projecting fork between said ends.

In testimony whereof I affix my signature in presence of two witnesses.

CLARENCE L. GOODRICH.

Witnesses:
B. M. W. HANSON,
HEATH SUTHERLAND.